Patented Sept. 17, 1940

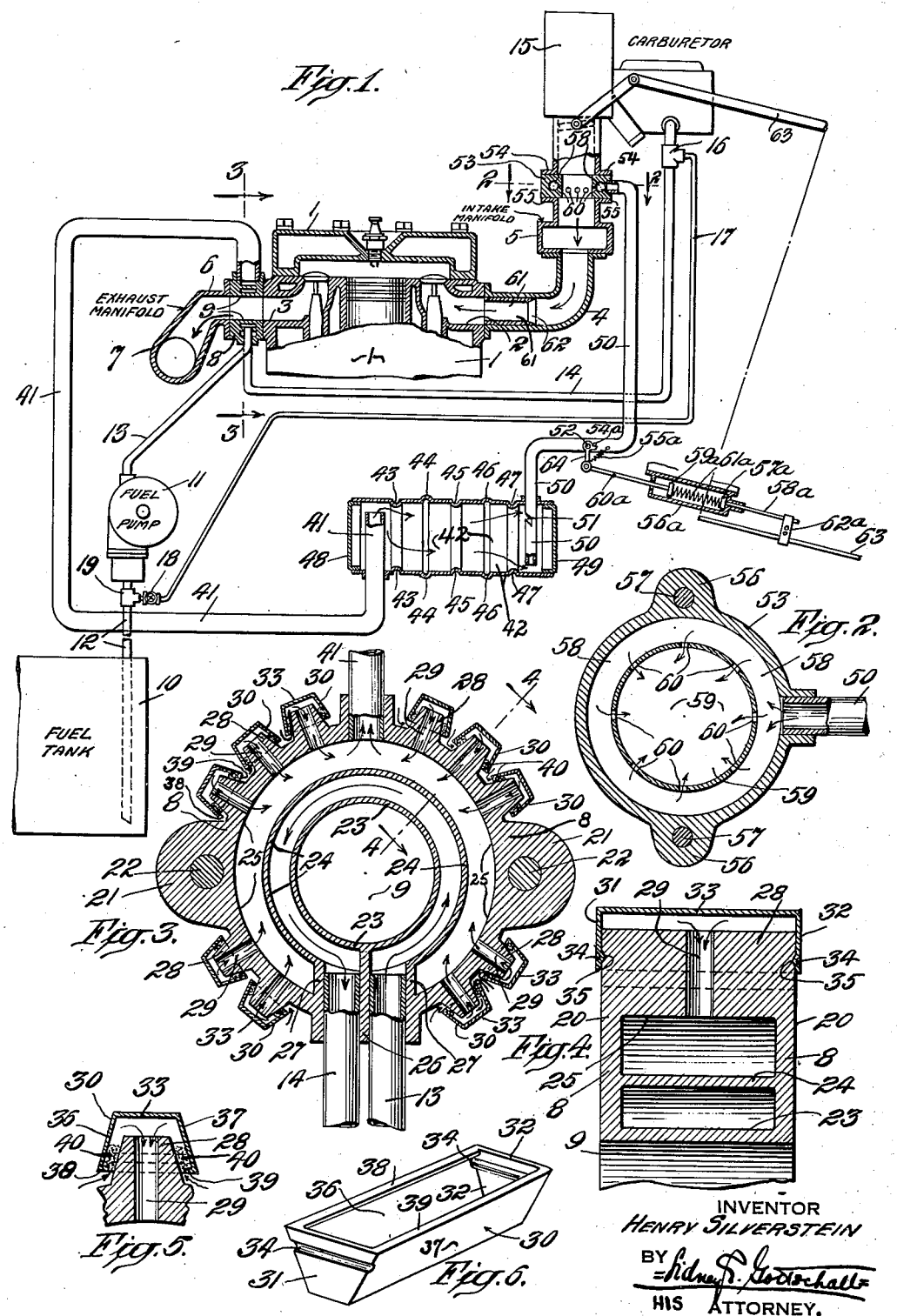

2,215,337

UNITED STATES PATENT OFFICE 2,215,337

HEATING DEVICE

Henry Silverstein, Brooklyn, N. Y.

Original application July 30, 1936, Serial No. 93,387. Divided and this application October 4, 1937, Serial No. 167,115

16 Claims. (Cl. 257—241)

This application is a division of my application, Serial No. 93,387, filed July 30, 1936, entitled "Method and apparatus for regulating charge for internal combustion engines," which application, after having been co-pending for a time with this application did mature into United States Letters Patent No. 2,179,235 on November 7, 1939.

This invention relates broadly to certain new and useful improvements in method and apparatus for regulating charge for internal combustion engines.

One of the objects of this invention is the provision of a construction wherein the combustible charge delivered to the cylinder of an internal combustion engine may be so regulated that when thus supplied it is at predetermined and proper conditions of temperature, pressure and density of mixture.

Another object of this invention is the provision of a construction wherein and whereby the combustible charge delivered at the intake port or ports of an internal combustion engine is at such conditions of temperature, pressure and density of mixture that the subsequent employment and combustion thereof will yield and develop a maximum of energy in the engine.

Another object of this invention is the provision of a construction which when used in conjunction with internal combustion engines of the automotive type is adapted to so control and regulate the conditions of the combustible charge supplied at the intake port or ports of the engine that a substantial increase in the mileage per gallon of fuel employed is produced and the fuel develops and yields a maximum of energy upon combustion thereof in the engine.

Another object of this invention is the provision of a construction adapted to so control and regulate the general characteristic conditions of the combustible charge delivered to the intake port or ports of an internal combustion engine that such charge upon "explosion stroke" of the engine is burnt and consumed to the greatest possible extent and a maximum of energy is developed thereby and extracted therefrom for useful work; and since the combustion of the charge is rendered as full and complete as possible a resulting substantial reduction in the quantity of "end products" such as carbon, carbon monoxide, etc., which normally are left over in considerable degree after combustion, is attained.

Another object of this invention is the provision of a construction wherein and whereby combustible fuel may be preheated from the heat of the exhaust gases of an internal combustion engine before such fuel is delivered to the carburetor, and wherein and whereby the mixture leaving the carburetor may be intimately associated with a predetermined proper amount of preheated air which likewise may be heated from the heat of the exhaust gases to predetermined and proper degree; and wherein and whereby the charge mixture resulting is thereafter regulated and delivered at proper and predetermined characteristic conditions at the intake port or ports of the internal combustion engine for employment in the cylinder or clyinders thereof.

A still further object of this invention is the provision of a construction wherein and whereby combustible fuel adapted to use in an internal combustion engine may be properly preheated before being delivered to the carburetor and the mixture leaving the carburetor may be further regulated by the addition thereto of a proper predetermined amount of preheated air at proper conditions of temperature, pressure and volume and the mixture thereafter so controlled and regulated as to general characteristic conditions that same will prove most efficient when employed in the engine, i. e., will produce a maximum of useful energy per unit volume of fuel employed.

A still further object of this invention is the provision of a construction wherein there is provided auxiliary means adaptable to use under cold weather conditions for providing the additional heat necessary to the proper preheating of fuel under such conditions and for the purposes and objects herein disclosed.

A still further object of this invention is the creation of a novel method for the preparation of a combustible charge for use in an internal combustion engine so that said charge when employed in the engine will prove most efficient, i. e., will produce a maximum of useful energy per unit volume of fuel employed; and which charge will be burnt and consumed to the greatest possible degree upon explosion thereof within the engine and leave a minimum of "end products" such as carbon, carbon monoxide, etc., which normally are left over in considerable degree after combustion.

A still further object of this invention is the provision of a construction which is rugged, simple and cheap to manufacture, install and use and which will present the desired advantages hereinafter disclosed.

Various other objects and advantages of the invention than those hereinabove mentioned will appear more fully hereinafter. It is to be understood, that the specific forms shown are merely illustrative and hence the detailed description thereof is not to be taken as limiting the invention itself.

This invention resides substantially in the parts as well as the combination, construction, arrangement and relative location of parts, as well as in the steps, sequence of steps and combinations of steps, all as will appear more fully hereinafter.

Referring to the drawing, in which the same reference numerals are used throughout the several views to indicate the same or similar parts, it will be found that:

Fig. 1 represents a diagrammatic view of an assembly of a construction employing the novel principles of my invention, shown with certain parts thereof in section and certain other parts thereof partially broken away;

Fig. 2 represents a sectional view, taken along the section line 2—2 in Fig. 1, looking in the direction of the arrows;

Fig. 3 represents a sectional view, taken along the section line 3—3 in Fig. 1, looking in the direction of the arrows;

Fig. 4 represents a sectional view, taken along the section line 4—4 in Fig. 3, looking in the direction of the arrows;

Fig. 5 is an enlarged detail view in section of one of the vanes shown as broken away from the heating unit shown in Fig. 3; and Fig. 6 is a perspective view of an inverted vane-canopy or cap of which sectional views are shown in Figs. 3 and 5.

It is well known that internal combustion engines of the automotive type having found wide industrial and commercial adaptation and use in automobiles, marine engines and the like, have nevertheless presented certain operating difficulties and shortcomings of undesirable character. Thus, as is well known, the combustible charge (even with substantially ideal conditions of timing, valve regulation, etc.) is usually incompletely burnt upon explosion of the charge within the engine cylinder or cylinders. Accordingly a maximum of energy per unit volume of fuel employed is not developed and the engines does not get as much work and energy out of the fuel as it possibly could. Moreover, due to incomplete combustion the left over gases presented for exhaustion on "exhaustion stroke" of the engine are relatively rich in "end products" such as carbon, carbon monoxide, etc. Thus carbon deposits are left on the walls of the cylinder or cylinders, valves, valve seats, valve stems, etc., the motor oil becomes polluted with carbon and various engine parts require periodic scraping or other appropriate treatment to keep the deposits at a minimum. Furthermore, often the exhaust gases will be found to contain a substantial unburnt portion of the original combustible charge and such portion, of course, is wasted.

Numerous attempts have been heretofore made in various directions looking towards a better or more complete combustion of the explosive charge supplied to the engine. I have found that proper predetermination and regulation of the characteristic conditions of the charge supplied to the engine cylinder or cylinders is effective to greatly increase the fullness and completeness of the combustion which takes place within the cylinder or cylinders, with a resulting substantial increase in efficiency. I have found also that this has entailed a very substantial increase in the amount of useful energy that could be developed by and extracted from the combustible charge per unit volume of fuel employed and further that a decidedly substantial reduction has been presented in the undesirable characteristics of the exhaust products such as carbon, carbon monoxide, etc., as well as unburnt gases.

It is the purpose of this invention, therefore, to provide method and apparatus for regulating the combustible charge supplied to the cylinder or cylinders of internal combustion engines so that appropriate, proper and necessary adjustment can be effected in the characteristic conditions of such charge and thereby attain the desired advantages just discussed.

As will be hereinafter noted, means are disclosed herein for presenting appropriate regulated preheating of fuel supplied to the carburetor in accordance with temperature conditions of the surrounding atmosphere and means are further provided to add to the charge leaving the carburetor an appropriate regulated amount of air in proper fashion and under proper conditions of temperature, pressure and volume. Further, it will be hereinafter observed that means are provided for regulating the conditions under which the charge is thereafter supplied at the intake port or ports of the internal combustion engine.

Referring now to the drawings for a specific example of my novel construction, it will be noted from Fig. 1 that I have shown a conventional internal combustion engine 1, having an inlet port 2 and an exhaust port 3. Although I will proceed to hereinafter describe my invention in connection with but a single engine cylinder, it should naturally be understood that the same may be employed in cases of engines comprised of more than a single cylinder. As is usually the case inlet port 2 is connected by a pipe 4 to an intake manifold 5 and exhaust port 3 is connected by a pipe 6 to the exhaust manifold 7. Connected between exhaust port 3 and pipe 6 I interpose my heating unit 8, more fully hereinafter described, in such fashion that the exhaust gases, etc. leaving exhaust port 3 will flow through a central passage-way 9, running therethrough on their way out through pipe 6 to the exhaust manifold 7. Due to the passage of the exhaust gases, etc. through passageway 9 a substantial portion of the heat contained therein will be available for furnishing the heat required by the heating unit 8. Turning now to the fuel supply it will be noted that I provide a conventional fuel tank 10 from which a fuel pump 11 (which is preferably engine driven) is adapted to draw gasoline or other fuel via a pipe 12 and to thereafter force the same along a pipe 13 to the heating unit 8. After leaving the heating unit the fuel, as heated in said unit, continues along a pipe 14 to a conventional carburetor 15 which may be either of the up or down draft type (the one illustratively shown in Fig. 1 of the drawing being a conventional down draft carburetor). Just before pipe 14 is joined to the casing of carburetor 15 it is provided with a T-coupling 16 to which is joined a by-pass pipe 17 adapted to by-pass a fraction of the quantity of heated fuel back to pipe 12 via a valve 18 and a T-coupling 19. It will be understood, of course, that although valve 18 is diagrammatically shown in the drawing as adjacent T-coupling 19, it, in actual practice, may be located either adjacent said coupling or adjacent the T-coupling 16 or as a matter of fact anywhere along the length of pipe 17, all as is best or most convenient and useful. It should be further understood that valve 18 is opened whenever it is desired that extra heat be furnished to the fuel, such for example as when the system disclosed operates during cold weather, or when it is found that the extra heat is required to assure proper ultimate characteristic conditions of the combustible charge. In this connection it will be observed that by by-passing and returning a fraction of the heated fuel just before the same enters the carburetor that the fuel generally will be given an extra amount of heat by the recirculation of the by-passed portion through the heating unit 8, and this will ultimately mean that the fuel generally will have more heat as and when supplied to the carburetor.

Turning now to the heating unit 8, it will be noted that the same has a general collar conformation, that is to say that such unit is more or less built in a generally cylindrical shape, having relatively flat ends 20. As aforementioned the element 8 is interposed between the exhaust port 3 and the pipe 6 and is firmly held in place by ears 21 and bolts 22, or by any other suitable securing means. The element 8 as aforementioned has running therethrough the central passageway 9 which is bounded by a cylindrical wall 23. Surrounding the cylindrical wall 23, but radially spaced apart therefrom by an appropriate distance is a second cylindrical wall 24, which, it will be noted, is radially spaced apart from the internal cylindrical surface 25, of heating unit 8.

It will be noted that each of pipes 13 and 14 are so arranged that the ends thereof lie adjacent each other and are separated by the element 26 which is integrally joined to wall 23. Thus, pipe 13 opens into one end of the chamber lying between walls 23 and 24 while pipe 14 opens into the other end of said chamber. It will be further noted that wall 24 is integrally joined to the inner surface 25 of unit 8 by the elements 27 at each end of wall 24. It, of course, will be understood that elements 26 and 27 need only be provided at the region where the pipes 13 and 14 join the unit 8, since the unit 8 throughout may be fabricated as a single element provided with appropriate passages therethrough and the walls constituting an integral part thereof. As a result of the construction just described it will be observed that I have provided within my heating unit 8 three concentric chambers. The innermost chamber is the passage-way 9 through which exhaust gases are adapted to pass from one flat surfaced side towards the other flat surfaced side of the unit 8, giving up heat in such passage to the surrounding chambers. The next chamber is that lying between walls 23 and 24 and here it will be noted that fuel entering from the open end of pipe 13 is adapted to circulate through said chamber in intimate contact with wall 23 and substantially circumferentially over the surface of said wall and to leave said chamber at its far end through the open end of pipe 14, it being understood that in and by such circulation the fuel is heated from the heat carried in the exhaust gases and given up therefrom in passage through passageway 9. The outermost chamber is, of course, that lying between wall 24 and the inner surface 25 of unit 8. The purpose and function of the outermost chamber will now be described in detail.

Turning to the outer surface of unit 8, it will be found that the same is preferably formed with a plurality of vanes 28 each of which extend from one flat surfaced side 20 over the whole of the width of the unit to the other flat surfaced side 20. These vanes are preferably an integral part of the metal of the unit 8 and the top or outermost surface of each of said vanes is preferably rectangular in outline, with each vane increasing in width from its top towards its bottom where it joins integrally with the outer surface of unit 8. Substantially in the very center both longitudinally and transversely of the rectangular top or outermost surface of each of the vanes 28 a radial cylindrical passageway 29 opens from said surface into the chamber lying between the wall 24 and the inner surface 25 of unit 8. Over the free end of each of the vanes 28 I preferably affix an inverted trough-like vane-canopy or cap 30, which is provided with sides 31 and 32 which are relatively flat and are adapted, on their inner surfaces, to snugly sit against the sides 20 of the unit 8. It will be understood that appropriate means are to be provided for holding each vane-canopy or cap 30 in proper inverted position with its bottom surface 33 radially spaced apart an appropriate distance from the rectangular top or outermost surface of each of the vanes 28. This means may consist in an internal rib or ridge 34 being impressed transversely of the width of each of sides 31 and 32 of element 30, which rib or ridge is arranged to snap into a cooperating channel 35 formed transversely of the metal of unit 8 on each of the surfaces 20 thereof, so that the sides 31 and 32, and, in fact the whole element 30, will be appropriately held in position with respect to the vane 28. At this point it should be understood that other means such as bayonet pins, with cooperating bayonet pin holes, or other suitable securing means might be employed for this purpose, but that I have found the rib and channel means satisfactorily effective.

It will next be noted that each vane-canopy or cap 30 is provided with sloping sides 36 and 37 which diverge away from the surface 33. Element 36 terminates in a flange 38 which lies in a plane substantially parallel to surface 33. Element 37 likewise terminates in a flange 39 lying in the same or substantially the same plane as that of element 38. Each of elements 38 and 39 are preferably integral with the vane-canopy or cap 30 and are of such width that an ample space is left between the free edge of each of said elements and the metal of the vane 28 when the vane-canopy or cap is held in position on the vane for the purposes herein disclosed. Interposed between the external sloping surfaces of each vane 28 and the internal surfaces of elements 36 and 37 of each vane-canopy or cap 30 and held in position by the flanges 38 and 39 there is a quantity of material 40, preferably such as stainless steel wool or the like, adapted to provide a filter for any air passing therethrough. It will be understood, of course, that the flanges 38 and 39 and the material 40 are adapted to extend over the whole of the width of each vane 28. It will be further understood that relatively cold air at atmospheric conditions is drawn at each vane 28 into the space between the sloping sides of the vane and the edges of elements 38 and 39, passes through the filter material 40, is guided by the walls 36, 37 up into the space lying between the surface 33 and the outermost surface of the vane and from there passes through passageway 29 into the chamber lying between the wall 24 and the internal surface 25 of the unit 8. Thus, it will be understood, filtered air enters into said chamber at a plurality of points over the circumference thereof, is heated in passing through said chamber and permitted to leave said chamber via the pipe 41 which is of relatively large diameter. It will therefore be understood that in the heating unit 8 the heat from the exhaust gases is adapted by passing through the passageway 9 to heat fuel caused to circulate in a concentric chamber and likewise to heat air in another outer concentric chamber.

The air, thus heated in the unit 8 and passing down the pipe 41 is admitted into a cylindrical chamber 42 adjacent the top thereof. Chamber 42, it will be noted, is more or less barrel-like in form and provided with a series of successive circular ribs. Starting adjacent the entry of pipe 41 into chamber 42 and going towards the right it will be observed that I preferably provide and have shown five circular ribs which successively are, an internal rib 43, an external rib 44, an internal rib 45, an external rib 46 and an internal rib 47. The effect of these ribs is to render the internal surface of the chamber 42 more or less corrugated with the result and effect that any fluids or solid material carried by the air passing therethrough will tend to be thrown down. Moreover, the presence of the ribs will tend to present a cooling vane effect and be effective to slightly cool the air passing from left to right in chamber 42 and guard against overheat of chamber 42 and its contents. The ends of chamber 42 are provided with threaded or snap-fit closure caps 48 and 49 either or both of which are preferably detachable and removable for purposes of cleaning the interior of the chamber and the like. Near the right end of the chamber 42 adjacent closure cap 49 an outlet pipe 50 opens adjacent the bottom of chamber 42. This outlet pipe just before it emerges from chamber 42 is provided with a diagonally downward pointed opening 51. It should be understood that the diameter of pipe 50 is smaller than that of pipe 41 and that the heated air entering from pipe 41 will in chamber 42 be somewhat cooled, allowed to expand, be cleaned and presented at pipe 50 for the further purposes and uses hereinafter described. It will next be noted that the provision of the opening 51 in pipe 50 will tend to prevent the flow in pipe 50 from being blocked and tend to mix with the cooler air coming from adjacent the bottom of chamber 42, a portion of heated air coming from adjacent the top of chamber 42.

The air flowing through pipe 50 is controlled by a valve 52 and after passing through said valve enters the collar-like mixing chamber 53 where it is mixed with the charge coming from the carburetor just before the same enters the intake manifold 5. The valve 52 may be of any standard type such as a conventional butterfly valve disposed in pipe 50 and so arranged that the same is always held slightly open by a pin stop 54a, said pin limiting the returning action of a resilient spring 55a tending to normally keep said valve closed. A preferable construction for control of valve 52 would consist in a stationary casing 56a in which a piston 57a and piston rod 58a as well as a second piston 59a and a piston rod 60a are adapted to work; said pistons being joined by a resilient element such as a spring or the like 61a. The piston rod 58a is preferably joined by a suitable connecting unit such as a rigid strap or the like 62a together with rod 63 coming from the foot accelerator, so that piston rod 58a and rod 63 will move together; while the piston rod 60a is adapted to actuate the valve 52 via a bell-crank lever 64. From this construction it will be observed that the butterfly valve 52 is always slightly open, that pressure of the foot on the accelerator will move rod 63 and connecting element 62a, so that the connected piston rod 58a as well as piston 57a, spring 61a, piston 59a, and piston rod 60a are moved along in casing 56a until piston 59a reaches the end of said casing at which time butterfly valve 52 will have been completely opened via piston rod 60a and bell-crank lever 64 against the returning action of spring 55a. Further pressure of the foot upon the accelerator will, of course, act merely to compress spring 61a and the butterfly valve will remain fully open. Release of pressure of the foot upon the accelerator, as is obvious, will result in the butterfly valve being closed except to the slight degree and as limited and arranged for by stop 54a. Thus it may be observed that the butterfly valve 52 is so arranged that the same will always be slightly open during idling of the motor and that upon feeding fuel to the motor to accelerate the same, the butterfly valve will immediately be thrown open to its full extent and remain so as long as foot pressure is maintained upon the accelerator.

Turning now to the collar-like mixing chamber 53, it will be found that the same is interposed between the flange-like end 54 of carburetor 15 and the flange-like end 55 of the inlet side of the intake manifold and that the same is firmly held in place by ears 56 and bolts 57. Chamber 53 is provided with an internal passageway 58 preferably of circular cross section which passageway runs completely around inside of the element 53, and provision is made so that pipe 50 will open into the passageway 58. It will be understood that the element 53, has a central cylindrical passageway 59 running therethrough so that the charge coming from the carburetor 15 may pass through the chamber 53 before entering the intake manifold 5. Passageway 58 opens into passageway 59 by means of a plurality of circumferentially spaced apart holes 60 so that the air transmitted along pipe 50 to passageway 58 may enter into passageway 59 at a plurality of points over the interior circumference thereof. The holes 60 joining passageway 58 with passageway 59 I preferably arrange to slant through the metal of element 53 in the direction of the flow of the charge through passageway 59. (See the holes 60 in Fig. 1 particularly those shown in the cross hatched portion of element 53.)

It will be understood from the foregoing that the heated air coming through pipe 50 and circulating in passageway 58 will, over the internal circumference of passageway 59 of element 53, enter into the passageway 59, become intimately associated with the charge passing through said passageway, and be intermingled therewith upon entry of the charge into the intake manifold.

In the pipe 4 joining the intake manifold with the inlet port of the engine and just before such pipe opens into the inlet port, I preferably provide a sleeve 61 of brass or like material provided with a chamfer 62 at the end furthest away from the inlet port. This sleeve, as is obvious, will have the effect of reducing the diameter of the orifice of pipe 4 as same opens into the inlet port and I believe the inclusion of such sleeve to be desirable; the chamfer of the sleeve being provided so as to leave substantially unimpeded the general smoothness of flow through pipe 4 towards the inlet port.

Having thus described a preferable construction, I will now briefly describe the method and manner of operation thereof. I have found that there are two requirements for high efficiency of combustion. In the first place the final compression pressure and temperature must be high. This results in high efficiency theoretically and in practice the charge usually is more readily ignited and burned from high pressure. The limit, of course, is reached when the pressure is so high as to cause spontaneous ignition of the charge during compression. It, of course, usually follows that the greater the pressure and temperature at the end of compression, the higher will be the final temperature immediately after ignition and just before the piston starts upon the explosion stroke.

In the second place the maximum temperature at this last mentioned particular point should really be as low as possible since loss of heat to the metallic cylinder walls, etc. increases rapidly at high temperatures and energy thus might be dissipated by unduly large heat losses just before the piston starts on expansion stroke. As is obvious, the two requirements for high efficiency are thus more or less opposed. However, such requirements are best brought into agreement with each other by the use of a large excess of air which gives a mixture which may be highly compressed without danger of spontaneous ignition. Due to the presence of a large excess of air, combustion and accompanying oxidation is rendered full and complete and because of the excess of air present, the final temperature attained immediately after explosion is comparatively low. Despite the presence of the excess air it might be said that the mixture burns rapidly enough at high pressures for satisfactory combustion. With these basic thoughts in mind it will be noted that in my construction fuel from the fuel tank 10 is delivered by the fuel pump to the heating unit 8 and thence to the carburetor where, being preheated, it receives the conventional amount of air provided in a carburetor. When the charge leaves the carburetor it is mixed in the mixing chamber 53 with a further amount of air which has been preheated, cleaned and placed under proper pressure and delivered to the mixing chamber 53 for entry into the passageway 59 via the holes 60. The final mixture of preheated fuel and air together with the added heated air at predetermined proper pressure and temperature is then delivered down to the intake manifold and passes through the sleeve 61, if present, before such mixture is delivered to the inlet port. Since I utilize for heat the residue heat in the exhaust gases of the engine the efficiency of my system is further increased.

It will be understood, of course, that due to the smaller size of the pipe 50 as compared with that of pipe 41 as well as the delivery of the air coming from pipe 50 into the charge coming from the carburetor 15, that for a given volume of charge the overall pressure will be increased and that the air will tend to "dilute" and render more "lean" resulting charge. The characteristic condition of the resulting mixture, I believe will be found thereafter to be still further beneficially affected by the sleeve 61 of reduced diameter. At this point it may be stated that, if desired, a conventional pressure raising means may be included. Thus, if desired, the resulting charge may be passed at proper rate of flow through a greatly narrowed orifice before entering the inlet port or even upon opening of the inlet valve be sprayed or otherwise forced into the cylinder through an appropriate orifice under the affirmative pressure of some pressure boosting means such as a pump or the like. However, in this regard, it must also be borne in mind that the pressure of the final mixture delivered into the cylinder should always be below a point where subsequent compression in the cylinder might result in possible spontaneous ignition of the charge as heretofore mentioned.

From the foregoing it will be understood that my system is such that the fuel is preheated from heat in the exhaust gases, mixed with air in the carburetor and the resulting mixture thereafter mixed with more air which has been preheated and thereafter the final mixture is delivered under suitable pressure to the inlet port. It will be further understood that I have disclosed various means and devices for assuring proper operating characteristic conditions of charge such as temperature, pressure, density and the like and further that I have provided devices for assuring proper cleanliness and conditioning of the air to be employed. Further, that I have provided means adapted to compensate for differences in atmospheric temperature.

It will, of course, be understood that it may be found more convenient or desirable to arrange to place the heating unit 8 directly in or around the exhaust manifold rather than immediately adjacent the exhaust port of a cylinder. This might be preferable in the case of an engine having many cylinders, however, in any event, such appropriate arrangements should be made that the heating unit 8 is so located that it is effective to produce the desired temperature of heat in the fuel and air to be heated. Further, it may be found in practice that location of such unit adjacent one of a number of cylinders will be sufficient. Further, in the case of an engine having many cylinders it may also be found desirable to interpose the sleeve 61 in the pipe leading to the intake manifold rather than in the various pipes leading from the intake manifold to the various inlet ports and just before such pipes open into said inlet ports. If this was done, I believe that the pipes leading from the intake manifold ought be of such diameter that the beneficial effects occasioned by the sleeve would be maintained right up to the respective inlet ports, i. e., the effective diameter of pipe having been decreased, the same ought not, in the pipes leading from the intake manifold, be in any way increased or so arranged that the mixture characteristic conditions are in any way varied in passage up to the inlet ports.

I am, of course, fully aware that these and various other changes in the details of construction and relative arrangement of parts will readily suggest themselves to those skilled in the art and I do not, therefore, desire to be limited to the exact details herein set forth by way of illustration, but rather to the spirit and scope of my invention as I define it in the appended claims.

What I seek to secure by and claim for United States Letters Patent is:

1. In a heating unit of the type described a solid cylindrical body having a central cylindrical passageway extending therethrough through which heated fluids may be passed, a plurality of separated and radially spaced apart concentric chambers therein encircling said central passageway through which respective chambers respective substances to be heated may be passed and a plurality of integral circumferentially spaced apart vane-like projections extending from the exterior periphery of said body and tapering down in thickness as radial departure is made away from the center of said body.

2. In a heating unit of the type described having a substantially cylindrical-like form and a plurality of separated spaced apart concentric chambers therein and having relatively flat ends, means for causing heated gases to pass through said unit from one flat end thereof towards the other, means for admitting fuel to an end of one of said concentric chambers for circulation therethrough, means for drawing off fuel after circulation thereof through said chamber, means for cleaning and admitting air to the other of said concentric chambers at a plurality of points over the circumference thereof for circulation in said chamber and means for drawing off the air after circulation thereof through said chamber.

3. The structure recited in claim 2 characterized in that the means for cleaning and admitting air to the appropriate concentric chamber consists in a plurality of integral vane-like projections spaced apart over the exterior circumference of the heating unit which projections have a substantially rectangular outermost end surface connected with the concentric chamber by a cylindrical hole leading from substantially the center of said rectangular surface to said chamber and characterized further in that an inverted trough-like vane-canopy or cap is affixed over the outermost end of each of said projections which supports and carries a quantity of filter material for filtering the air and cleaning the same before it is permitted to enter the concentric chamber by the above mentioned holes.

4. In a combination fuel and air heater of the type described for internal combustion engines a body, a cylindrical passageway extending longitudinally therethrough, through which passageway heated engine exhaust gases may be passed, a chamber concentric with and substantially completely surrounding but separated from said passageway through which chamber fuel may be circulated and heated, a fuel inlet port and a fuel outlet port connected to said chamber, a second separated chamber externally concentric with and substantially completely surrounding said first mentioned chamber, means for admitting air to said second chamber at a plurality of points which are circumferentially spaced apart over the surface of the chamber for circulation and heating therewithin and an outlet port through which the air heated within said second chamber may exit therefrom.

5. The structure recited in claim 4 characterized in that the heater is of substantially cylindrical form and the means for admitting air to the second chamber at a plurality of points consists in a plurality of circumferentially spaced apart vane-like projections each having an orifice therethrough joining the external surface thereof with the second mentioned chamber, and each vane-like projection being capped with a canopy into which air may be admitted from below and thereby directed into said orifice in the vane-like projection for passage therethrough and from thence into the second mentioned chamber for circulation and heating therewithin.

6. In a heating unit of the type described a substantially cylindrical body, a passageway extending longitudinally therethrough, through which passageway heated fluids may be passed, an internal chamber within said body radially spaced apart from said passageway, a plurality of tooth-like vanes formed on the external peripheral surface of said body, passageways connecting the outermost surfaces of said tooth-like vanes with the internal chamber, and means for filtering a substance to be admitted to the internal chamber through the said last mentioned passageways.

7. A substantially cylindrical body having a plurality of circumferentially spaced apart teeth on the external peripheral surface thereof, a passageway extending through said body through which a heated substance may be passed to heat said body, an internal chamber in said body surrounding and separated from said passageway, an inlet port to said chamber in each of the aforementioned teeth and an outlet port for said chamber.

8. In a heating unit for simultaneously heating a plurality of separately chambered fluid currents, a body the material of which is relatively high in heat conductivity, said body having a central passageway extending longitudinally therethrough from one end thereof to the other, through which a heated substance may be passed to heat the same, a plurality of radially spaced apart chambers formed in said body concentrically about said passageway, each chamber, being separated from the other, and the chamber most closely adjacent the heated central passageway, being separated therefrom, by portions of the material of the body, and both of said chambers being separated from the external surfaces of the body by substantially thick portions of the body material, and each of said chambers being thermally united directly with said heated passageway through the aforementioned portions of the body material, and inlet means and outlet means for each of said chambers.

9. The structure recited in claim 4 characterized in that the means for admitting air to the second chamber at a plurality of points consists in a plurality of vane-like projections provided on the external surface of the heater, each of which projections has a passageway therein connecting the external surface thereof with the second mentioned chamber.

10. In a heating unit of the type described, a body, a passageway extending through said body, through which passageway heated substances may be passed to heat the body, said body having a plurality of separated spaced apart chambers formed therein concentrically about the aforementioned passageway, an inlet port through which fuel to be heated may enter one of said chambers for circulation concentrically about the aforementioned passageway, an outlet port through which said fuel may leave said chamber atfer circulation, a plurality of circumferentially spaced apart inlet ports through which air to be heated may be admitted to another of said chambers, and an outlet port through which such air may leave said last mentioned chamber.

11. In a heating unit, a body, means for passing heated substances through said body to heat the same, said body having a plurality of separated chambers concentrically arranged about the aforementioned means for passing heated substances through the body, inlet and outlet means for each of said chambers, and the inlet means of one of said chambers consisting in a plurality of vane-like projections formed on the external surface of the heater body, each such projection having a passageway therein joining the outer surface thereof with the concentric chamber into which said inlet means open; whereby a substance may be admitted to said chamber at a plurality of points which are circumferentially spaced apart over the surface thereof.

12. The structure recited in claim 11 characterized in that the free end of each of the mentioned vane-like projections is capped with a canopy through which the said substance is admitted to the passageway in the projection for passage into said chamber.

13. In a heat exchange unit, a body having a chamber therein in which a substance may undergo variation in its heat content, said body having a plurality of circumferentially spaced apart ports opening into said chamber, each port consisting in a vane-like projection formed on the external surface of the body and tapering down in thickness as departure is made away from the body, said projection having an orifice extending therethrough and joining the outer surface thereof with the said chamber; said structure being characterized in that a canopy is mounted over the free end of each projection; each canopy having walls which generally follow the external configuration of the projection over which it is mounted, and being so constructed that a filter may be supported thereby.

14. A vane-canopy or cap of the type described having a bottom, two opposed sides substantially normal to said bottom, and two opposed sides sloping from said bottom; said recited construction being characterized in that a portion of a substantially normal side is pressed therefrom to provide means for securing the vane-canopy or cap to the structure upon which it is mounted.

15. A vane-canopy or cap of the type described having a bottom, two opposed sides substantially normal to said bottom, and two opposed sides sloping from said bottom; said recited construction being characterized in that means are provided on a substantially normal side of the vane-canopy or cap for securing it to the structure upon which it is mounted.

16. The structure recited in claim 15 further characterized in that means adapted to support a filter are provided on a sloping side.

HENRY SILVERSTEIN.

CERTIFICATE OF CORRECTION.

Patent No. 2,215,337. September 17, 1940.

HENRY SILVERSTEIN.

It is hereby certified that error appears in the printed specification of the above numbered patent requiring correction as follows: Page 5, first column, line 69, for the word "condition" read --conditions--; and second column, line 12, after "charge" insert a comma; page 6, first column, line 53, claim 4, for "the" before "chamber" read --said--; and that the said Letters Patent should be read with this correction therein that the same may conform to the record of the case in the Patent Office.

Signed and sealed this 5th day of November, A. D. 1940.

(Seal)

Henry Van Arsdale,
Acting Commissioner of Patents.